United States Patent [19]

Ho

[11] Patent Number: 5,619,286
[45] Date of Patent: Apr. 8, 1997

[54] EYE PROTECTIVE GLASS WITH ITS POSITION ADJUSTABLE IN ALL DIRECTIONS

[76] Inventor: Chien-Charn Ho, 9F3R, No. 210, chung hsueh Rd., Tainan, Taiwan

[21] Appl. No.: 516,911

[22] Filed: Aug. 18, 1995

[51] Int. Cl.[6] .................................................. H04N 5/72
[52] U.S. Cl. ............................................ 348/835; 348/834
[58] Field of Search ................................... 348/834, 835, 348/836, 837, 838, 839, 840, 841, 842; 359/601, 608, 609; 351/41, 158

[56] References Cited

U.S. PATENT DOCUMENTS

| | | | |
|---|---|---|---|
| 4,907,090 | 3/1990 | Ananiom | 348/834 |
| 5,320,318 | 6/1994 | Chen | 348/834 |

*Primary Examiner*—Hung X. Dang

[57] ABSTRACT

An eye protective glass with its position adjustable in all directions has a glass body fixed with a frame surrounding the glass body. The frame is provided with a vertical hole each in two vertical sides for installing a support rod of each of two adjusting units, which enable the frame with the glass body to move up and down to alter its position vertically. A support rod base is additionally provided to have an upper curved-up cap and a base disc rotatably combined with the upper cap for fitting movably the horizontal portion of each support rod in a straight semicircular groove in the upper cap. Then the support rod can be moved forward of backward to alter the position of the frame with the glass body. And the upper cap can be rotated relative to the base disc, enabling the support rod to be moved right and left to alter the position of the frame with the glass body to the right and to the left.

3 Claims, 7 Drawing Sheets

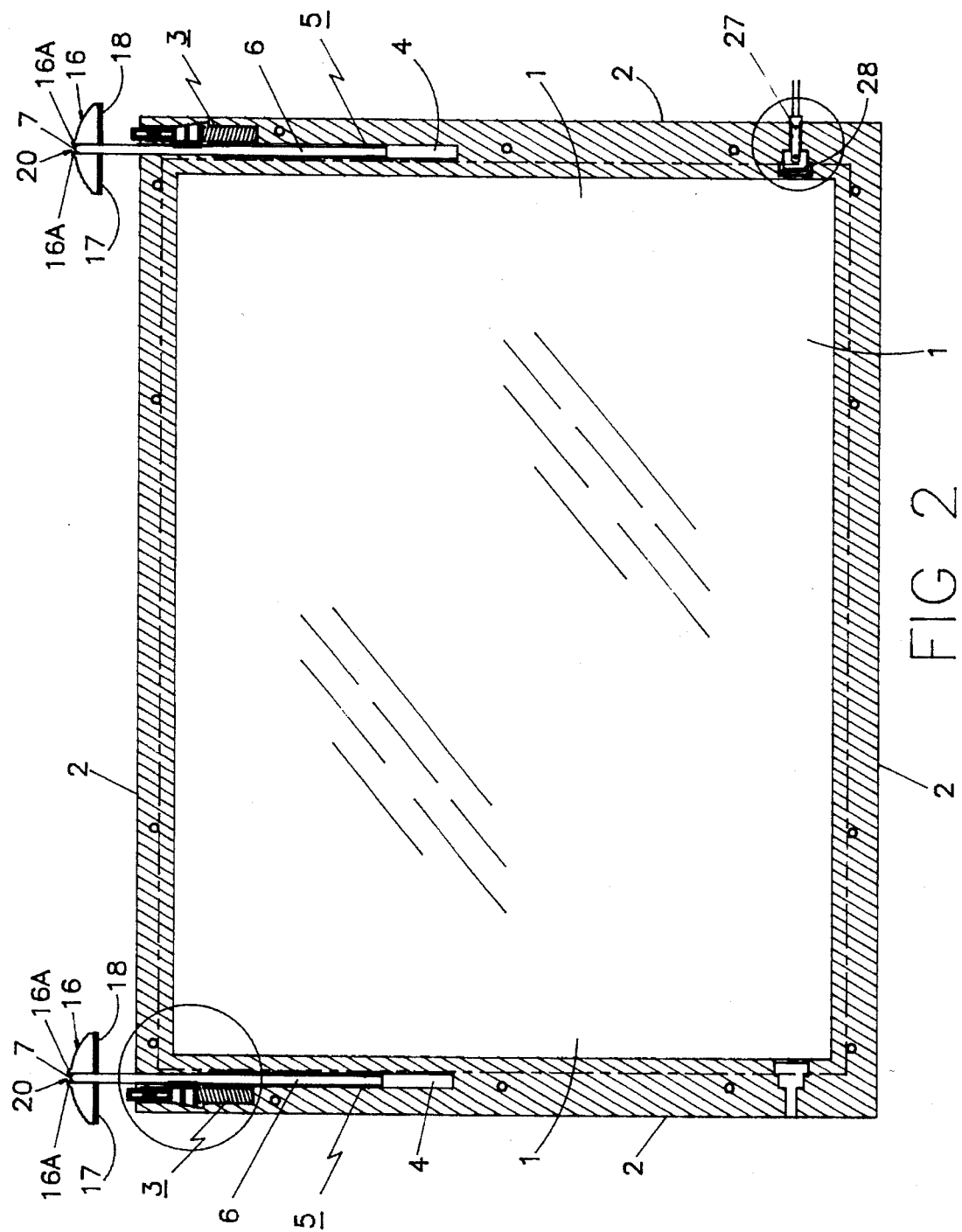

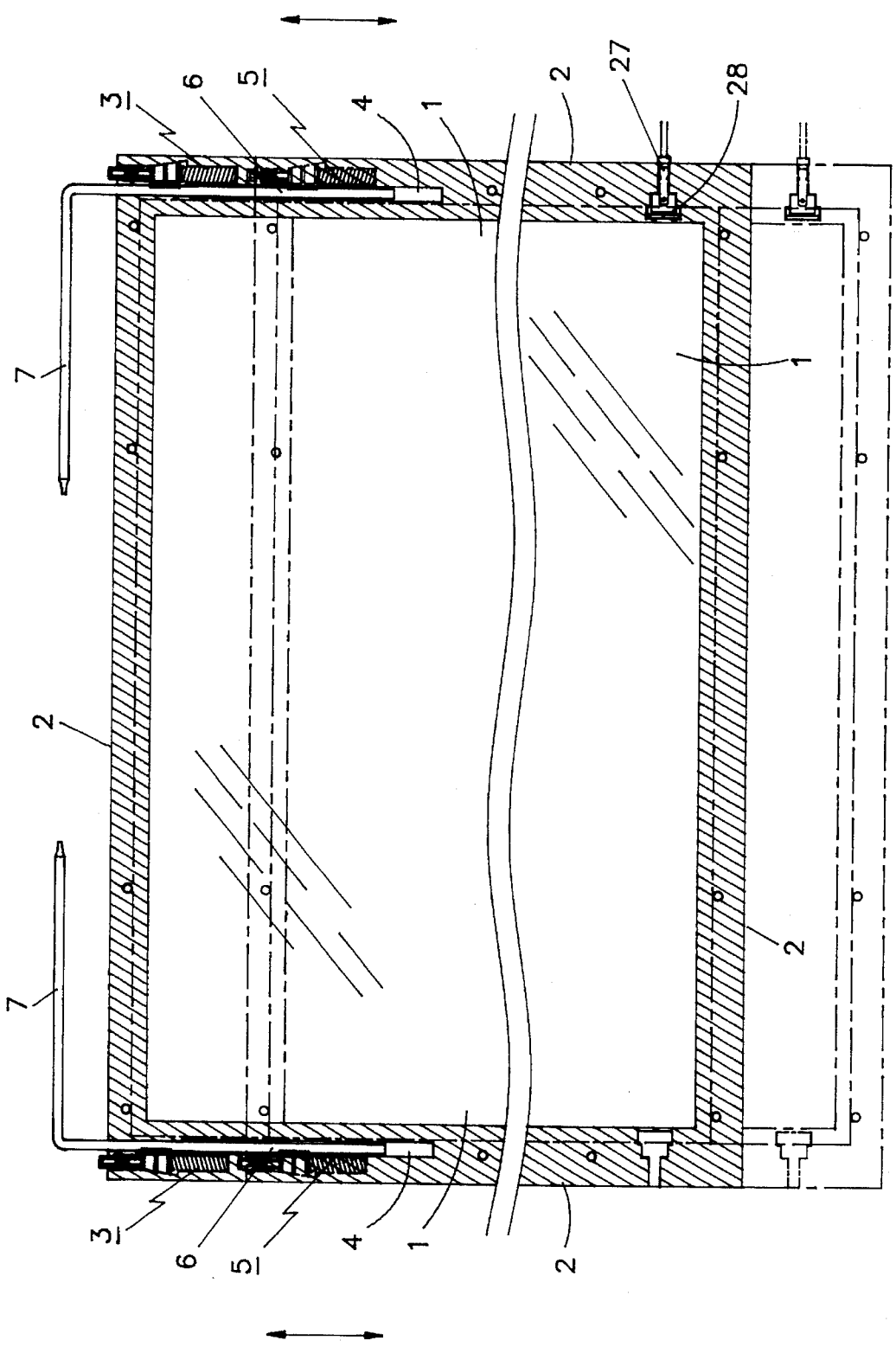

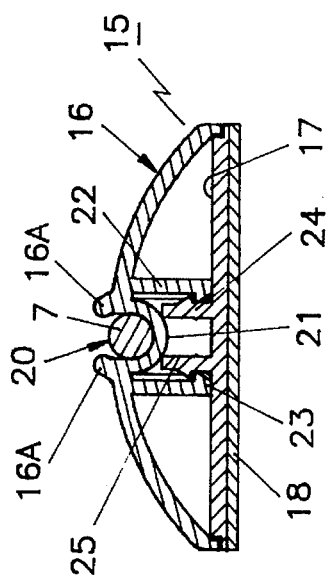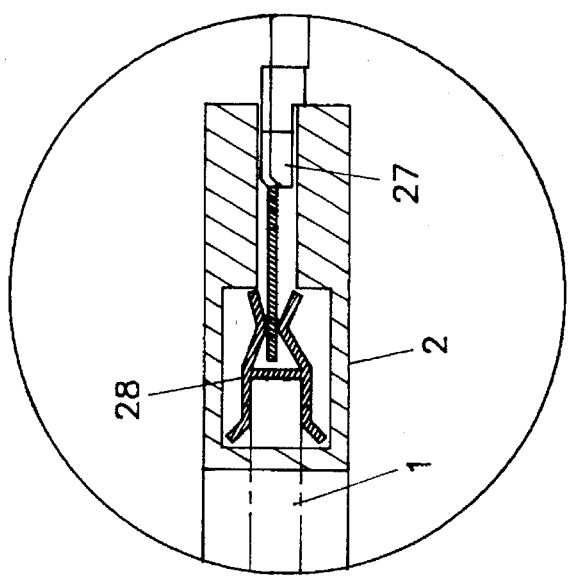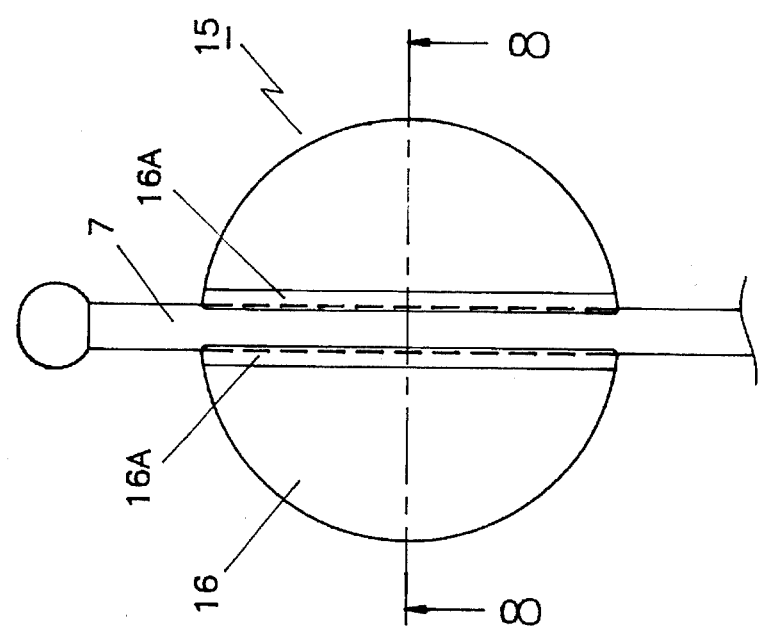

EYE PROTECTIVE GLASS WITH ITS POSITION ADJUSTABLE IN ALL DIRECTIONS

BACKGROUND OF THE INVENTION

This invention concerns an eye protective glass with its position adjustable in all directions, particularly having two sets of adjusting units mounted with a frame fixed around the glass.

A known conventional eye protective glass for the screen of a TV set, as shown in FIG. 1, has two position bases A, A fixed on an upper side of the cabinet of the TV set with scotch tape, and a support rod B respectively fitting horizontally through each position base A to position the glass C. However, this positioning way can only fix the glass in front of the screen, impossible to be adjusted in its position in any direction to cope with any size and shape of a screen a TV set has.

SUMMARY OF THE INVENTION

This invention has been devised to offer a kind of eye protective glass with its position adjustable in all directions.

One feature of the present invention is that the glass fixed around with a frame can be moved up and down vertically to alter its position by means of two vertical adjusting units.

Another feature of the present invention is that the glass with the frame can be moved forward and backward, as well as moved to the right and to the left, by means of two support rod bases mounted on an upper side of the cabinet of a TV set.

BRIEF DESCRIPTION OF DRAWINGS

The invention will be better understood by reference to the accompanying drawings, wherein:

FIG. 2 is a cross-sectional view of an embodiment of a eye protective glass with its position adjustable in all directions in the present invention:

FIG. 3 is a cross-sectional view of the embodiment of a eye protective glass with its position adjustable in all directions present invention, showing it being adjusted vertically.

FIG. 8 is an upper view of a support rod base in the present invention;

FIG. 9 is a cross-sectional view of line 8—8 of FIG. 7;

FIG. 10 is a magnified view of a ground terminal in the present invention.

DESCRIPTION OF THE PREFERRED EMBODIMENT

Figure 1:
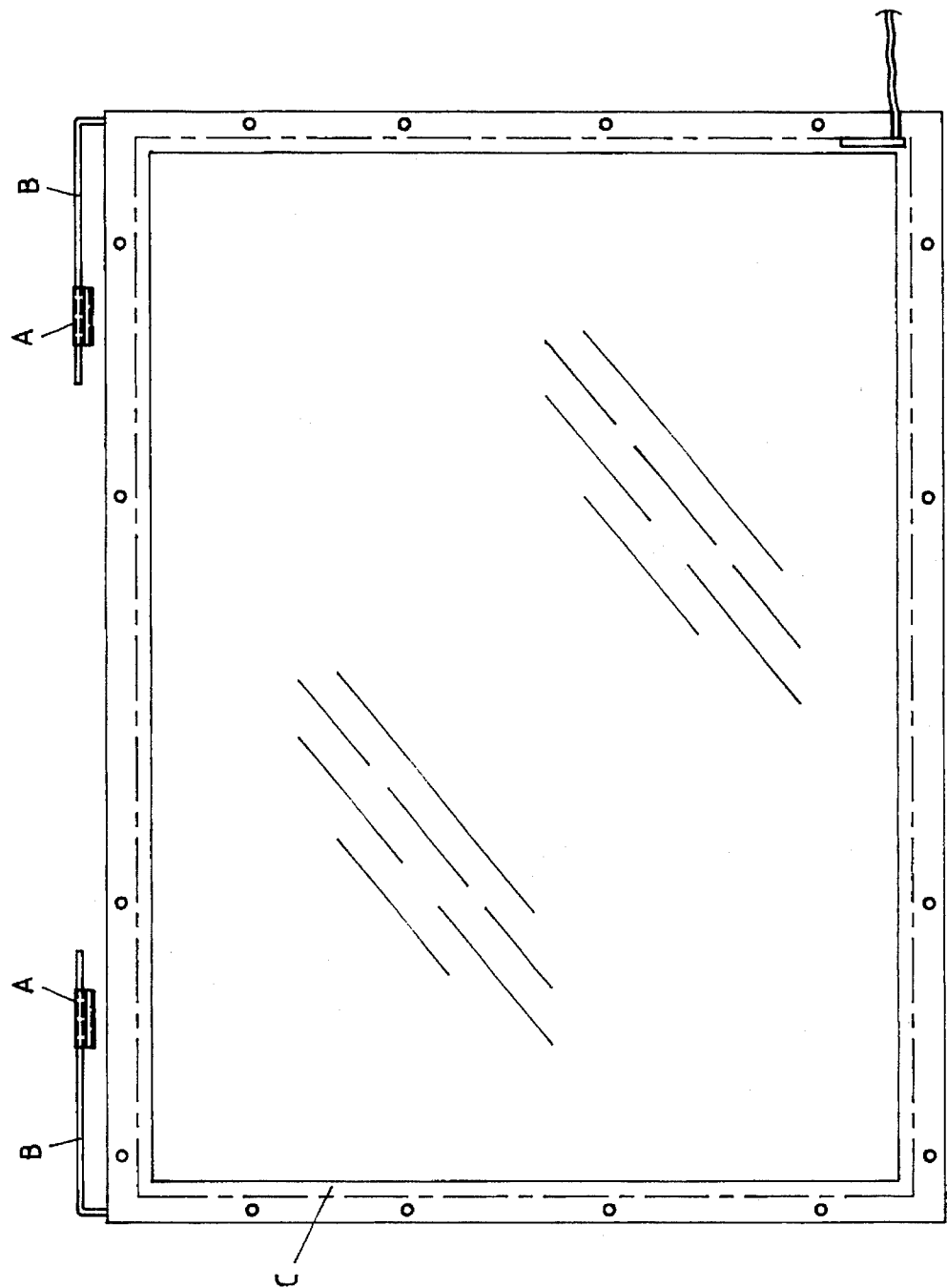
FIG. 1 is a front view of a known conventional eye protective glass.

An eye protective glass with its position adjustable in all directions in the present invention, as shown in FIG. 2, includes at least a glass body 1, a frame 2 fixed around the glass body 1, and two adjusting units 3, 3.

The frame 2 has two opposite vertical sides respectively provided with a vertical hole 4 in an upper portion for receiving a support rod 5 of the adjusting unit 3 to fit therein movably.

Figure 5:
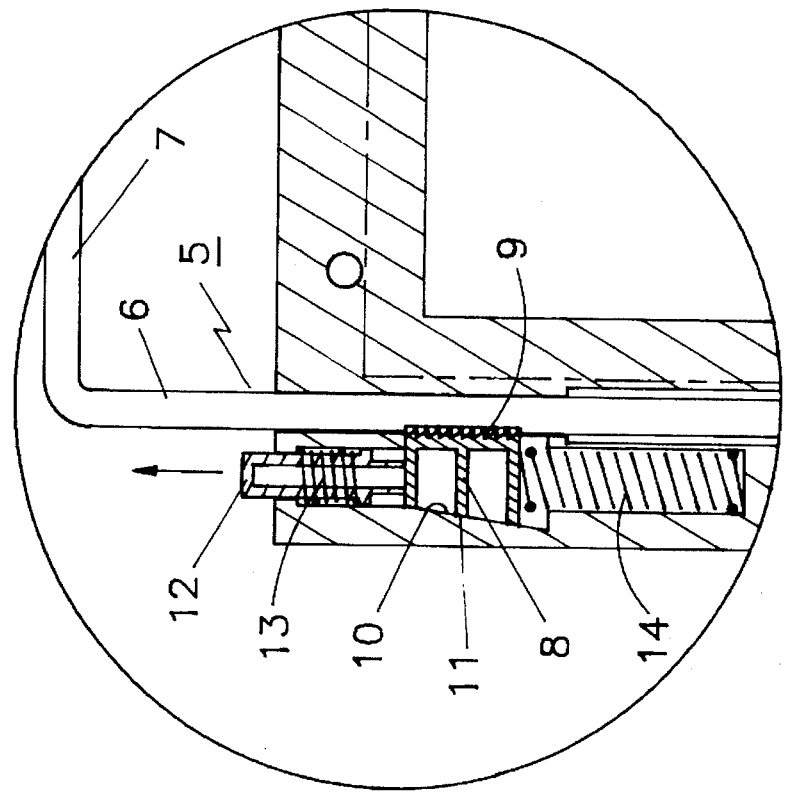
FIG. 5 is another magnified cross-sectional view of the embodiment of an eye protective glass with its position adjustable in all directions in the present invention.
Figure 4:
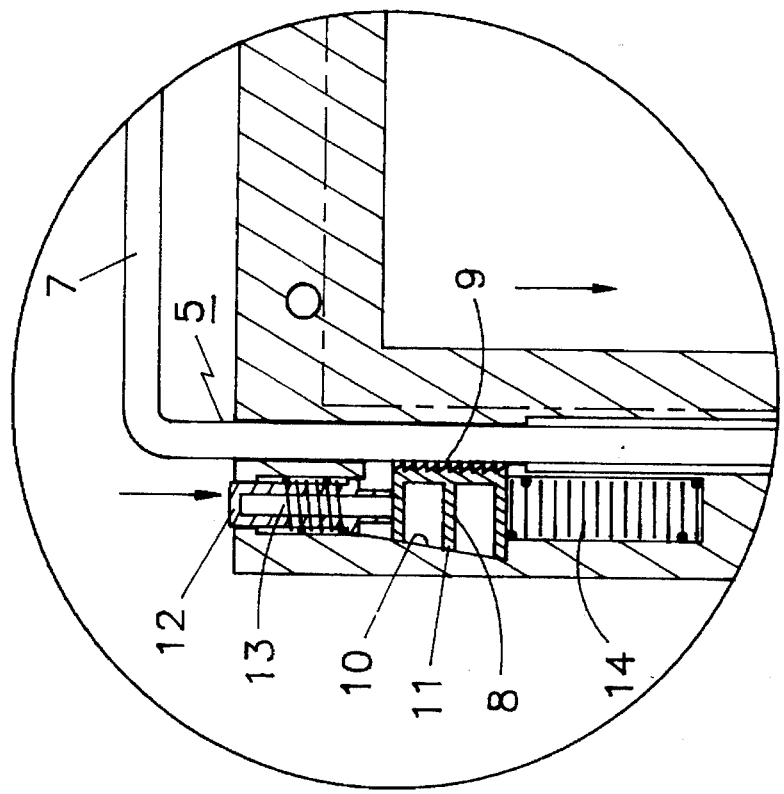
FIG. 4 is a magnified cross-sectional view of the embodiment of an eye protective glass with its position adjustable in all directions in the present invention.

Each adjusting unit 3 consists of a support rod 5 having a vertical portion 6 and a horizontal portion 7 extending from the top of the vertical portion 6. The vertical portion 6 fits in the vertical hole 4 of the frame 2, movable therein up and down, and the horizontal portion 7 extends over an upper side of the cabinet of a TV set. The adjusting unit 3 further has a position block 8 provided with sloping down teeth 9 on a right vertical side as shown in FIGS. 4 and 5 and a sloped vertical surface 10 on a left vertical side. The sloped vertical surface 10 contacts with a sloped wall 11 of the vertical hole 4 to guide the position block 8 to move up and down in a definite direction. Further, a push bar 12 is provided on the position block 8, with a spring 13 fitted around the push bar 12, and another coil spring 14 is provided under the position block 8 to push back the position block 8 the position block 8 to its normal (first) position wherein the position block 8 always tightly presses to the right side to contact with its teeth 9 with the outer surface of the vertical portion 6 after the block 8 is pressed down by the push bar 12 to a released (second) position wherein the teeth 9 separate from the vertical portion 6. Therefore, in case that the glass body is needed to be moved in its position vertically, the two push bars 12, 12 are pressed down to allow the position blocks 8, 8 in the normal (first) position to be moved down to the released (second) position and then the glass body 1 with the frame 2 can be altered in its position by pulling up or pushing down the vertical portion 6. And after the position of the glass body is adjusted, the push bar 12, 12 are released to allow the position blocks 8, 8 to move up to the normal (first) position by resilience of the coil spring 14 under the blocks 8, 8 and to press hard with the sloped down teeth 9 against the vertical portion 6 of the support rod 5, thus keeping the vertical portion 6 immovable and securely. Consequenty, the weight of the glass body 1, the sloped down teeth 9 and the support rods 5 can function with each other to keep the glass body at an adjusted position tightly and securely.

In addition, the horizontal portion 7 of the support rod 5 may be supported in a support rod base 15 consisting of a base disc 17 and an upper curved-up cap 16 extending curving upward on the base disc 17. Then the bottom of the base disc 17 is adhered by scotch tape 18 on an upper side of the cabinet of a TV set. The upper curved-up cap 16 has a semicircular straight groove 20 in a diametrical direction, and the groove 20 has the same diameter as that of the support rod 5 and a slightly smaller opening defined by two curved edges 16A, 16A so that the support rod 5 may be kept therein securely and tightly but movably.

Figure 6:
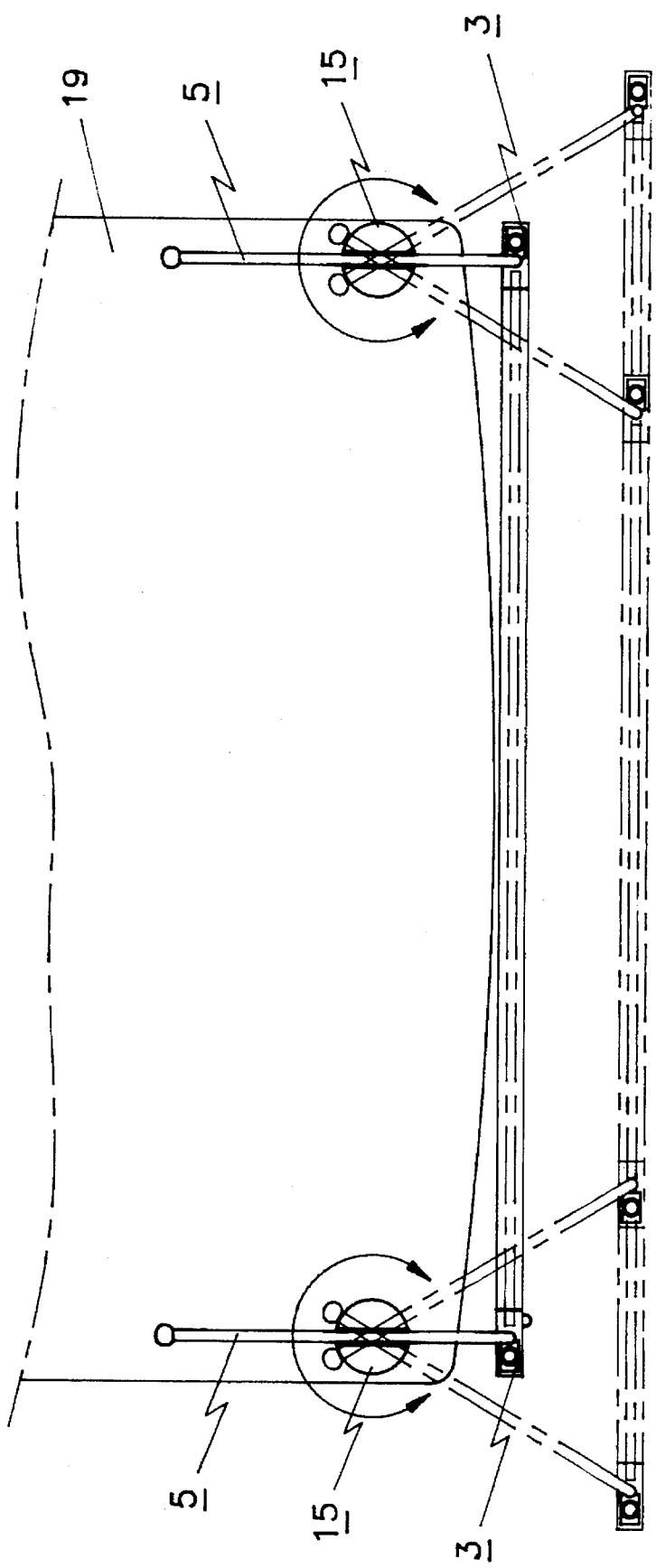
FIG. 6 is an upper view of the embodiment of an eye protective glass with its position adjustable in all directions in the present invention, showing it being adjusted to move to the right or the left.
Figure 7:
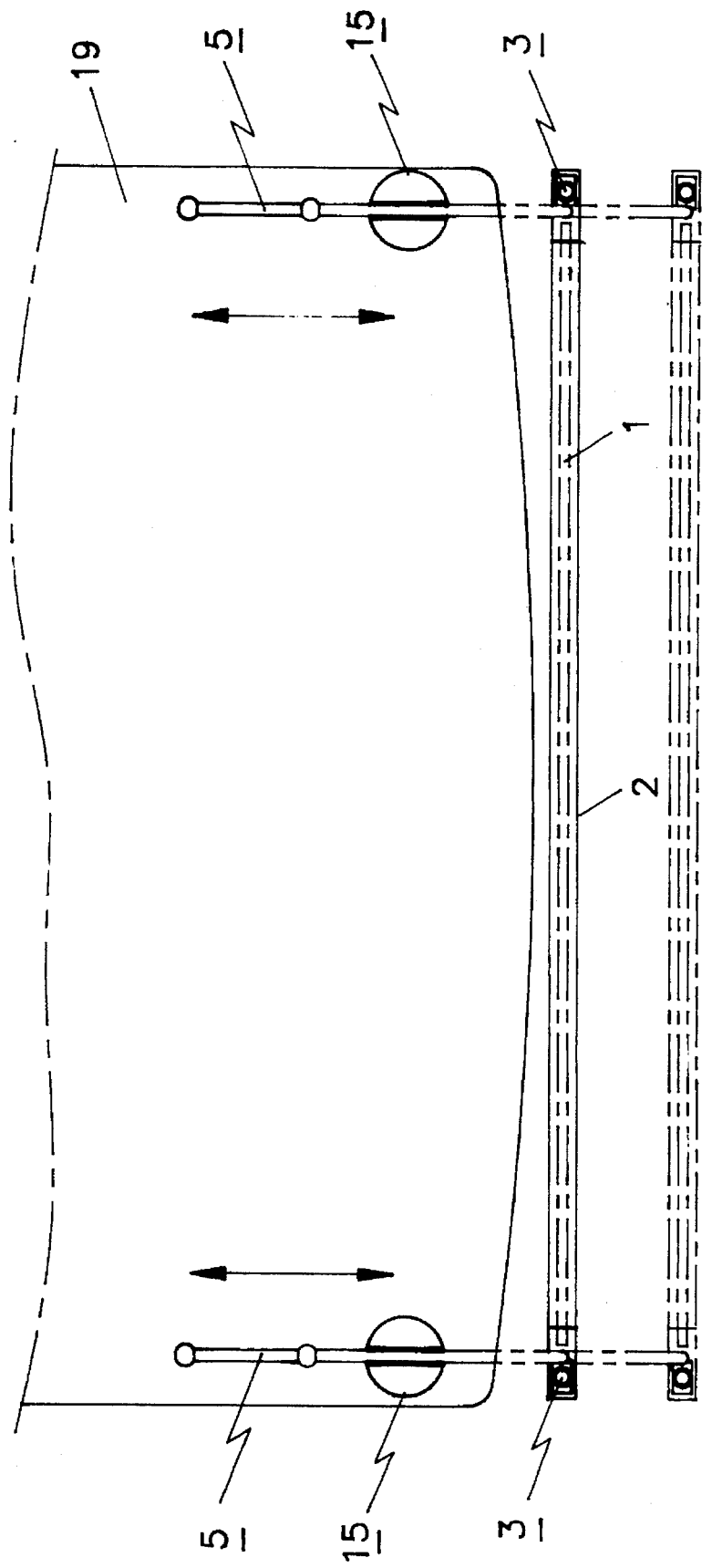
FIG. 7 is an upper view of the embodiment of an eye protective glass with its position adjustable in all directions in the present invention, showing it being adjusted to move forward and backward.

The upper cap 16 of the support rod base 15 further has a curved-up wall 21 defining the groove 20, an annular wall 22 extending down from the curved-up wall 21, a projecting annular ridge 23 provided on an inner surface of the annular wall 22. The base disc 17 has an annular upright walls 24 standing upright on an upper flat surface and a cavity 25 surrounded by the annular wall 24 receiving the curve-up wall 21 of the upper cap 16. And the wall 24 has a projecting-outward ridge 26 to engage with the projecting-inward annular ridge 23 of the upper cap 16 so as to let the upper cap 16 rotate relative to the base disc 17. Consequently, as shown in FIGS. 5 and 6, the horizontal portion 7 of each support rod 5 can be adjusted backward and forward in its position held in each support rod base 15, and thus the glass body 1 can be adjusted to move forward and backward relative to the screen of the TV set, in other words, the distance between the glass body 1 and the screen can be adjusted.

In addition, the frame 2 has each of two opposite sides provided with a ground terminal hole as shown in FIGS. 3 and 9, and a metal terminal 28 is fixed with a side of the glass body 1 for the ground terminal 27 to engage so as to ground the glass body 1 for removing static electricity.

While the preferred embodiment of the invention has been described above, it will be recognized and understood that various modifications may be made there in and the appended claims are intended to cover all such modifications which may fall within the spirit and scope of the invention.

What is claimed is:

1. An eye protective glass with its position adjustable in all directions, comprising:

a glass body;

a frame fixed around said glass body and having a hole respectively in two opposite vertical sides for placing therein an adjusting unit described below;

two adjusting units respectively having a support rod consisting of a vertical portion and a horizontal portion extending from an upper end of said vertical portion, a position block having sloping down teeth on a right side and a sloping-down outward surface at a left side, a push bar on said position block, a coil spring being fixed around said push bar, another coil spring located under said position block, said push bar being pushed down to move down said position block in a normal position wherein said position block tightly press with its toothed side against an outer surface of said vertical portion of said support rod to a releasing position, guided by said sloping-down outward surface, wherein said position block moves outward to separate from said vertical portion of said support rod, enabling said vertical portion of said support rod move up or down so as to move and keep said frame with said glass body adjusted in its position in a vertical direction; and a support rod base provided to have an upper curved-up cap and a base disc placed under said cap, said upper portion having a support rod groove for fitting therein said horizontal portion of said support rod, said upper curved-up cap further having a curved wall defining said support rod groove and an annular vertical wall extending down from said curved wall said annular vertical wall having a projecting inward annular ridge on its inner surface, said base disc having an annular upright wall standing up from an upper flat surface, and a cavity surrounded by said round upright wall for receiving said curved wall of said upper cap, said annular upright wall having an annular projecting-outward ridge to engage with said annular projecting-inward ridge of said upper cap, said horizontal portion of said support rod being movable forward and backward in said support rod groove of said upper cap of said support rod base, said frame with said glass body able to be adjusted to move to the left and to the right if said upper cap of said support rod base is rotated relative to said base disc of said support rod base.

2. The eye protective glass with its position adjustable in all directions as claimed in claim 1, wherein each said vertical hole in each said two opposite sides of said frame has a sloped vertical wall at a left side for contacting with said sloped surface of said position block so that said position block may be moved up so that said position block my tightly press against the outer surface of said vertical portion of said support rod or moved down to leave away from said outer surface of said vertical portion of said support rod.

3. The eye protective glass with its position adjustable in all directions as claimed in claim 1, wherein said frame is provided with a terminal hole for fixing a metal terminal with said glass body to engage with a ground terminal.

* * * * *